(12) United States Patent
Gil et al.

(10) Patent No.: US 12,258,152 B2
(45) Date of Patent: Mar. 25, 2025

(54) DRONE DELIVERY SYSTEM HUB FOR FACILITATING PARCEL DELIVERY BY UNMANNED AERIAL VEHICLES

(71) Applicant: United Parcel Service of America, Inc., Atlanta, GA (US)

(72) Inventors: Julio Gil, Veldhoven (NL); Thomas Ramsager, Atlanta, GA (US); Jeff Walp, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 389 days.

(21) Appl. No.: 17/532,247

(22) Filed: Nov. 22, 2021

(65) Prior Publication Data

US 2023/0159192 A1 May 25, 2023

(51) Int. Cl.
*B64U 70/70* (2023.01)
*B64F 1/32* (2006.01)
(Continued)

(52) U.S. Cl.
CPC .............. *B64U 70/70* (2023.01); *B64F 1/32* (2013.01); *B64U 80/10* (2023.01); *B64U 80/25* (2023.01);
(Continued)

(58) Field of Classification Search
CPC ........ B64U 70/70; B64U 70/90; B64U 80/10; B64U 80/40; B64U 80/25; B64U 2101/64;
(Continued)

(56) References Cited

U.S. PATENT DOCUMENTS

| | | | |
|---|---|---|---|
| 9,815,633 B1 * | 11/2017 | Kisser | G06Q 10/0832 |
| 10,266,346 B1 * | 4/2019 | Kisser | G01M 17/00 |

(Continued)

FOREIGN PATENT DOCUMENTS

| | | | | |
|---|---|---|---|---|
| CN | 111977234 A | * | 11/2020 | B64C 39/02 |
| CN | 112079065 A | * | 12/2020 | B64C 39/02 |

(Continued)

OTHER PUBLICATIONS

International Search Report and Written Opinion received for PCT Patent Application No. PCT/US2021/060364, mailed on Feb. 24, 2022, 12 pages.

(Continued)

*Primary Examiner* — Joshua J Michener
*Assistant Examiner* — Arfan Y. Sinaki
(74) *Attorney, Agent, or Firm* — Shook, Hardy & Bacon L.L.P.

(57) ABSTRACT

A drone delivery system hub and method for sending for take-off and receiving for landing unmanned aerial vehicles (UAVs). The drone delivery system hub includes a center shaft frame, a parcel-conveying system supported by the center shaft frame, structural arms coupled to and extending outward from the center shaft frame in a spoke-like configuration, drone-conveying systems each supported by one of the structural arms, and a linking conveyor span. The drone-conveying system conveys the UAVs along a length of a correspond one of the structural arms toward and away from the center shaft frame. The linking conveyor span selectably rotates to different orientations between different pairs of the structural arms, selectively conveying a UAV thereon between any two of the structural arms. The linking conveyor span is located above the parcel-conveying system such for the UAV thereon to deposit and retrieve parcels from the parcel-conveying system.

18 Claims, 11 Drawing Sheets

(51) Int. Cl.
  *B64U 10/14* (2023.01)
  *B64U 80/10* (2023.01)
  *B64U 80/25* (2023.01)
  *B64U 80/40* (2023.01)
  *B64U 101/64* (2023.01)

(52) U.S. Cl.
  CPC .............. *B64U 80/40* (2023.01); *B64U 10/14* (2023.01); *B64U 2101/64* (2023.01)

(58) Field of Classification Search
  CPC ...... B64F 1/32; B64F 1/06; B64F 1/04; B64F 1/10; B64F 1/00; B64F 1/36; B64F 1/22; B64F 1/222
  See application file for complete search history.

(56) References Cited

U.S. PATENT DOCUMENTS

| | | | |
|---|---|---|---|
| 10,453,022 | B2 | 10/2019 | Gil |
| 10,460,281 | B2 | 10/2019 | Gil |
| 10,586,201 | B2 | 3/2020 | Gil et al. |
| 11,066,183 | B2 * | 7/2021 | Zosel ........................ B64F 1/22 |
| 2016/0257423 | A1 | 9/2016 | Martin |
| 2017/0175413 | A1 * | 6/2017 | Curlander ................. B64F 1/32 |
| 2020/0013008 | A1 * | 1/2020 | Newcomb ............ G05D 1/0022 |
| 2020/0130863 | A1 | 4/2020 | Zosel |
| 2020/0140121 | A1 | 5/2020 | Kim |
| 2020/0361634 | A1 | 11/2020 | Gil |

FOREIGN PATENT DOCUMENTS

| | | | | |
|---|---|---|---|---|
| FR | 3088620 | A1 | 5/2020 | |
| KR | 20200048859 | A * | 5/2020 | ............. B64C 39/02 |

OTHER PUBLICATIONS

Office action received for Canadian Patent Application No. 3197237, mailed on Sep. 5, 2024, 4 pages.

* cited by examiner

DRONE DELIVERY SYSTEM HUB FOR FACILITATING PARCEL DELIVERY BY UNMANNED AERIAL VEHICLES

CROSS-REFERENCE TO RELATED APPLICATIONS

This application claims priority to U.S. Provisional Patent Application No. 63/116,461 entitled "A DRONE DELIVERY SYSTEM HUB FOR FACILITATING PARCEL DELIVERY BY UNMANNED AERIAL VEHICLES," filed Nov. 20, 2020, which is incorporated by reference in its entirety.

BACKGROUND

Home delivery of parcels has traditionally been performed using human couriers. Delivery companies have begun to explore the possibility of delivering parcels using unmanned systems in collaboration with human couriers to increase delivery efficiency and to decrease the physical demands on human couriers. However, there remain unsolved problems when delivering parcels using unmanned technologies.

For example, fulfillment centers and warehouses generally have loading docks for manually loading and unloading parcels into and out of delivery trucks and trailers. However, traditional loading docks are ill-equipped for the technical and logistical demands of take-off and landing of numerous unmanned aerial vehicles (UAVs). Upon landing of a drone or UAV, battery changes and drone diagnostic requirements also can take up valuable floor space in existing fulfillment centers, warehouses, or the like.

SUMMARY

At a high level, aspects described herein relate to a drone delivery system hub that facilitates delivery of parcels by unmanned aerial vehicles (UAVs), also referred to herein as drones. In some embodiments, the drone delivery system hub can be installed on a rooftop or in a parking lot, although any installation location can be used. The drone delivery system hub comprises a center shaft and a plurality of structural arms extending therefrom in a spoke-like fashion. The center shaft can support therein or thereon a parcel-conveying system (e.g., a set of cargo elevators or the like) that conveys parcels from a lower opening of the center shaft to an upper opening thereof. The higher opening provides access to the structural arms. In some embodiments, the drone delivery system hub further comprises a plurality of drone-conveying systems each affixed to and/or supported by the structural arms. The drone-conveying systems are each operable to receive and convey one or more drones along a length of the structural arms for landing, take-off, battery swaps, automated diagnostics, and/or conveyance to the parcel-conveying system for dropping off or picking up of parcels. The drone delivery system hub further comprises at least one linking conveyor span selectably rotatable to selectably align with one or more of the drone-conveying systems. The linking conveyor span can be located at or proximate to the upper opening of the center shaft for receiving or delivering parcels from or to the UAVs.

In use, a UAV may retrieve a parcel from the upper opening of the center shaft from the parcel-conveying system while on the linking conveyor span, then be conveyed onward to one of the drone-conveying systems, which then launches the UAV in an upward and/or outward direction away from the drone delivery system hub for delivery of the parcel. Upon returning, the UAV then can attach to one of the drone-conveying systems during landing and be conveyed to the linking conveyor span for retrieval of a next parcel from the parcel-conveying system and/or for dropping off of another parcel to the parcel-conveying system. The linking conveyor span can be selectively rotated to link with any select one of the drone-conveying systems to allow the UAV to be stored on a particular one of the structural arms and/or to take off in a particular direction as determined based on a variety of predetermined factors. As the UAV is conveyed along one of the drone-conveying systems, battery charging stations and/or autonomous drone diagnosis systems located along one or more of the structural arms can communicate with or otherwise engage with the UAVs, such as swapping of batteries or requesting, receiving, and/or outputting diagnostic data.

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1:
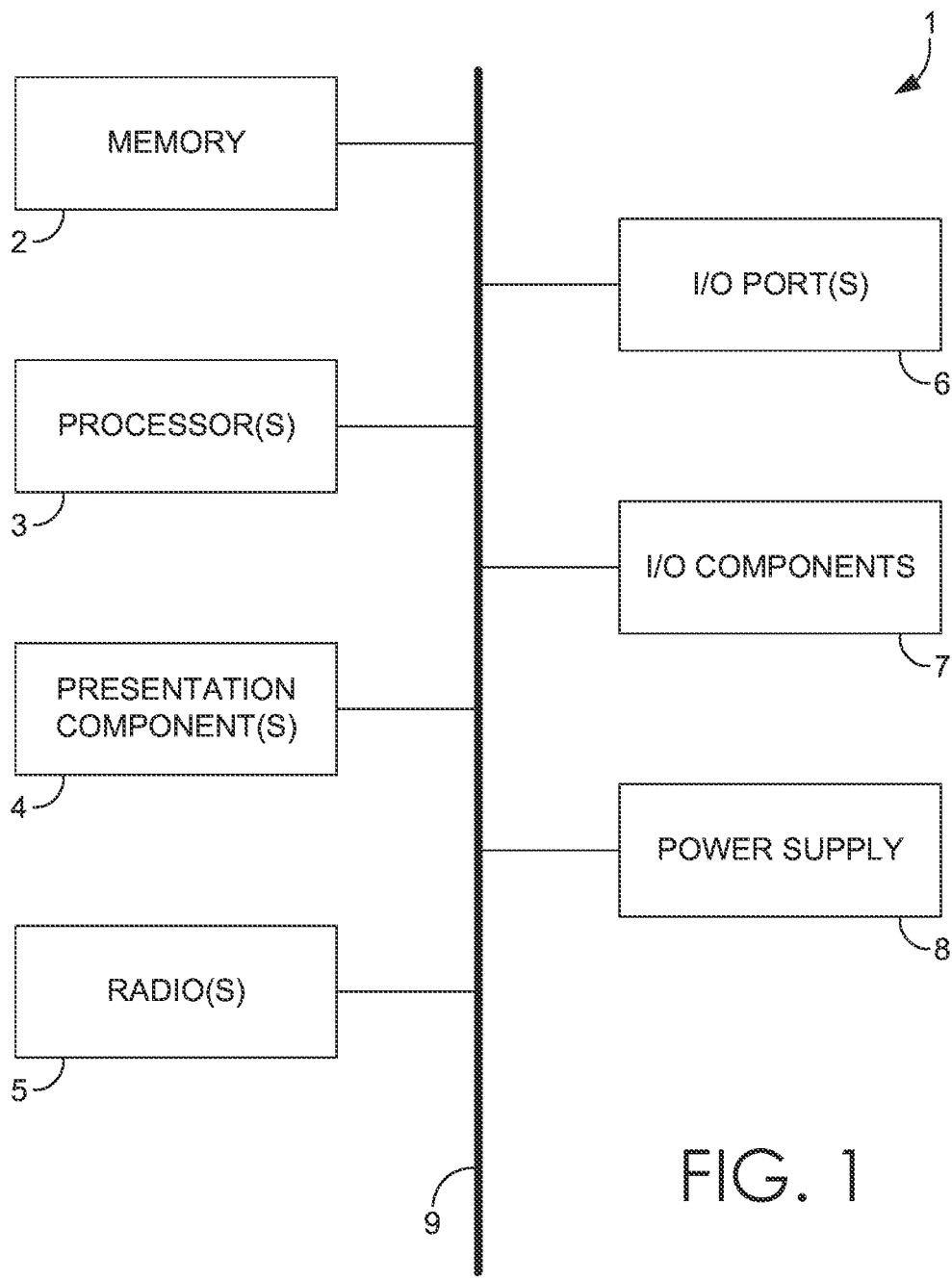
FIG. 1 depicts a block diagram of an example computing device in accordance with an embodiment thereof.

The subject matter of this disclosure is described herein to meet statutory requirements. However, the description is not intended to limit the scope of the invention. Rather, the claimed subject matter may be embodied in other ways, to include different steps, combinations of steps, features, and/or combinations of features, similar to those described in this disclosure, and in conjunction with other present or future technologies. Moreover, although the terms "step" and/or "block" may be used herein to identify different elements of methods employed, the terms should not be interpreted as implying any particular order among or between various elements except when the order is explicitly described and required.

In general, and at a high level, this disclosure describes, among other things, embodiments that enable and support parcel delivery via unmanned systems taking off from and/or landing on a drone delivery system hub. Unmanned systems such as drones or unmanned aerial vehicles (UAVs) can be used for parcel delivery without the manual labor such parcel delivery traditionally requires. However, while fulfillment centers, warehouses, or other unmanned systems generally have loading docks for manually loading and unloading parcels into and out of delivery trucks and trailers, such loading docks are ill-equipped for the technical and logistical demands of take-off and landing of numerous unmanned aerial vehicles. Upon landing, battery changes and drone diagnostic requirements also can take up valuable floor space in existing fulfillment centers, warehouses, or the like. Such space requirements in regard to battery changes, diagnostic checks, drone take-off, and drone landing can also complicate the sending and receiving of UAVs from other various locations, such as shopping centers, delivery vehicles, trains, kiosks, or the like.

To solve the limitations of these labor-intensive technologies for sending and receiving parcels from a location via UAV, retrofitting of fulfillment centers and warehouses may be employed for effective and efficient use of unmanned systems. Specifically, the drone delivery system hub described herein is one solution for retrofitting buildings, parking lots, vehicles, or any one of a variety of places or structures from which parcels are sent and received. For example, the drone delivery system hub may be installed on a rooftop of a building, fulfillment center, or warehouse, extending upward therefrom and providing an efficient and autonomous structure for landing and take-off of unmanned systems, as well as pick-up and/or drop-off of parcels from the drones landing and taking off therefrom.

In some embodiments, the drone delivery system hub comprises a center shaft frame and a plurality of structural arms extending outward therefrom for facilitating landing, retrieval of at least one parcel, and taking off of one or more UAVs. The height of the center shaft frame may be designed to advantageously limit the expenditure of the UAVs limited battery charge per flight, since the UAVs are not required to descend as low during landing and then ascend as high during take-off. By allowing launching and retrieving of UAVs safely from increased height, the drone delivery system hub saves energy and extends delivery range. The plurality of structural is advantageous for simultaneous sending and/or receiving numerous UAVs in numerous directions for safe and efficient management of UAV traffic to and/or from the drone delivery system hub.

The drone delivery system hub can further include a parcel-conveying system that conveys parcels upwards and/or downwards along the center shaft frame. However, the parcel-conveying system can convey parcels in other directions besides just upwards and/or downwards without departing from the scope of the technology described herein. In some embodiments, the drone delivery system hub also includes a plurality of drone-conveying systems each supported by one of the structural arms and operable for transporting one or more of the UAVs or drones along a length of one or more of the plurality of structural arms. The drone delivery system hub can also include a linking conveyor span at a central location for rotatably linking the drone-conveying systems with each other to allow the UAVs to be conveyed from one of the drone-conveying systems, onto the linking conveyor span, and then onto another one of the drone-conveying systems for storing or subsequent take-off therefrom. This linking conveyor span thus allows the UAVs to be selectively sent in any one of a plurality of directions during take-off based on destination, wind conditions, UAV air traffic, or the like. Alternatively, the linking conveyor span can be fixed and the structural arms can be rotatably attached to the center shaft, such that the structural arms can rotate to provide for a rapid launch of multiple UAVs in desired directions.

The drone delivery system hub may further comprise battery charging stations for storing and/or charging one or more batteries for the UAVs on the structural arms, as well as autonomous drone diagnosis systems located along at least one of the structural arms. This advantageously saves time, since the UAVs can perform these critical tasks between flights at a raised elevation without human intervention or needing to bring the UAVs down from elevated structural arms for performing such tasks. It is also more energy efficient, avoiding the need to carry heavy batteries up and down the center shaft. Furthermore, allowing these critical tasks of charging batteries and performing pre-flight checks/diagnostic activities to take place on the drone delivery system hub, little to no floor space is required for such activities within the building, fulfillment center, or warehouse.

Throughout this disclosure, "unmanned systems," "drones," and "UAVs" include systems that are capable of operating for at least a period of time without input from an on-board human. Unmanned systems may include terrestrial, aquatic, or aerial vehicles. An unmanned system may sometimes include a human on board who is capable of taking control of the unmanned system or that provides instructions to the unmanned system. Some unmanned systems may operate without a human on board, but may be controlled or partially controlled remotely by a human pilot. Some unmanned systems may operate autonomously by receiving instructions from a computer program. Thus, to complete an objective, an unmanned system may operate autonomously, under the guidance of received instructions, or under partial or total control of a human pilot. The word "drone" is synonymous with "unmanned system" as used herein.

One example of an aerial unmanned system is an unmanned aerial vehicle, more commonly called a UAV or a drone. The UAVs or drones discussed and illustrated in this disclosure are a four-rotor vertical takeoff and landing UAVs. However, the UAVs or drones may include any number of rotors, may be embodied as be a fixed-wing aircraft, or some combination of both. As used in this disclosure, the word "delivery" is intended to mean both "to drop off" and "to pick up," unless one of the options is impracticable. For example, a "delivery vehicle" is a vehicle capable of picking up a parcel and dropping off a parcel at a location.

Various controllers described herein, as well as other subject matter disclosed herein may be provided as, at least in part, a method, a system, and/or a computer-program product, among other things. Accordingly, certain aspects disclosed herein may take the form of hardware, or may be a combination of software and hardware. A computer-program that includes computer-useable instructions embodied on one or more computer-readable media may also be used. The subject matter hereof may further be implemented as hard-coded into the mechanical design of computing components and/or may be built into a system or apparatus that enables automated or semi-automated operation of the drone conveying system hub as described herein.

Computer-readable media may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided in this disclosure. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Referring now to FIG. 1, a block diagram of an example computing device 1 suitable for supporting the operation of embodiments described herein is provided, in accordance with an embodiment hereof. The computing device 1 and components thereof can be or can include any of the controllers described herein. It should be noted that although some components depicted in FIG. 1 are shown in the singular, they may be plural, and the components may be connected in a different, including distributed, configuration. For example, computing device 1 might include multiple processors and/or multiple radios. As shown in FIG. 1, computing device 1 includes a bus 9 that may directly or indirectly connect different components together, including memory 2, processor(s) 3, presentation component(s) 4 (if applicable), radio(s) 5, input/output (I/O) port(s) 6, input/output (I/O) component(s) 7, and power supply 8.

Memory 2 may take the form of the memory components described herein. Thus, further elaboration will not be provided here, but memory 2 may include any type of tangible medium that is capable of storing information, such as a database. A database may include any collection of records, data, and/or other information. In one embodiment, memory 2 may include a set of computer-executable instructions that, when executed, facilitate various functions or steps associated with the subject matter described herein. These instructions will be referred to as "instructions" or an "application" for short. The processor 3 may actually be multiple processors that may receive instructions and process them accordingly. The presentation component 4 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or a lighted keyboard). However, the presentation component 4 may be omitted without departing from the scope of the technology described herein.

The radio 5 may facilitate communication with a network, and may additionally or alternatively facilitate other types of wireless communications, such as Wi-Fi, WiMAX, LTE, Bluetooth, and/or VoIP communications, among other communication protocols. In various aspects, the radio 5 may be configured to support multiple technologies, and/or multiple radios may be configured and utilized to support multiple technologies.

The input/output (I/O) ports 6 may take a variety of forms. Exemplary I/O ports may include a USB jack, a stereo jack, an infrared port, a firewire port, and/or other proprietary communications ports. The input/output (I/O) components 7 may comprise one or more keyboards, microphones, speakers, touchscreens, and/or any other item useable to directly or indirectly input data into the computing device 1. The power supply 8 may comprise batteries, generators, fuel cells, and/or any other component that may act as a power source to supply power to computing device 1 and to any other components described herein.

Figure 2:
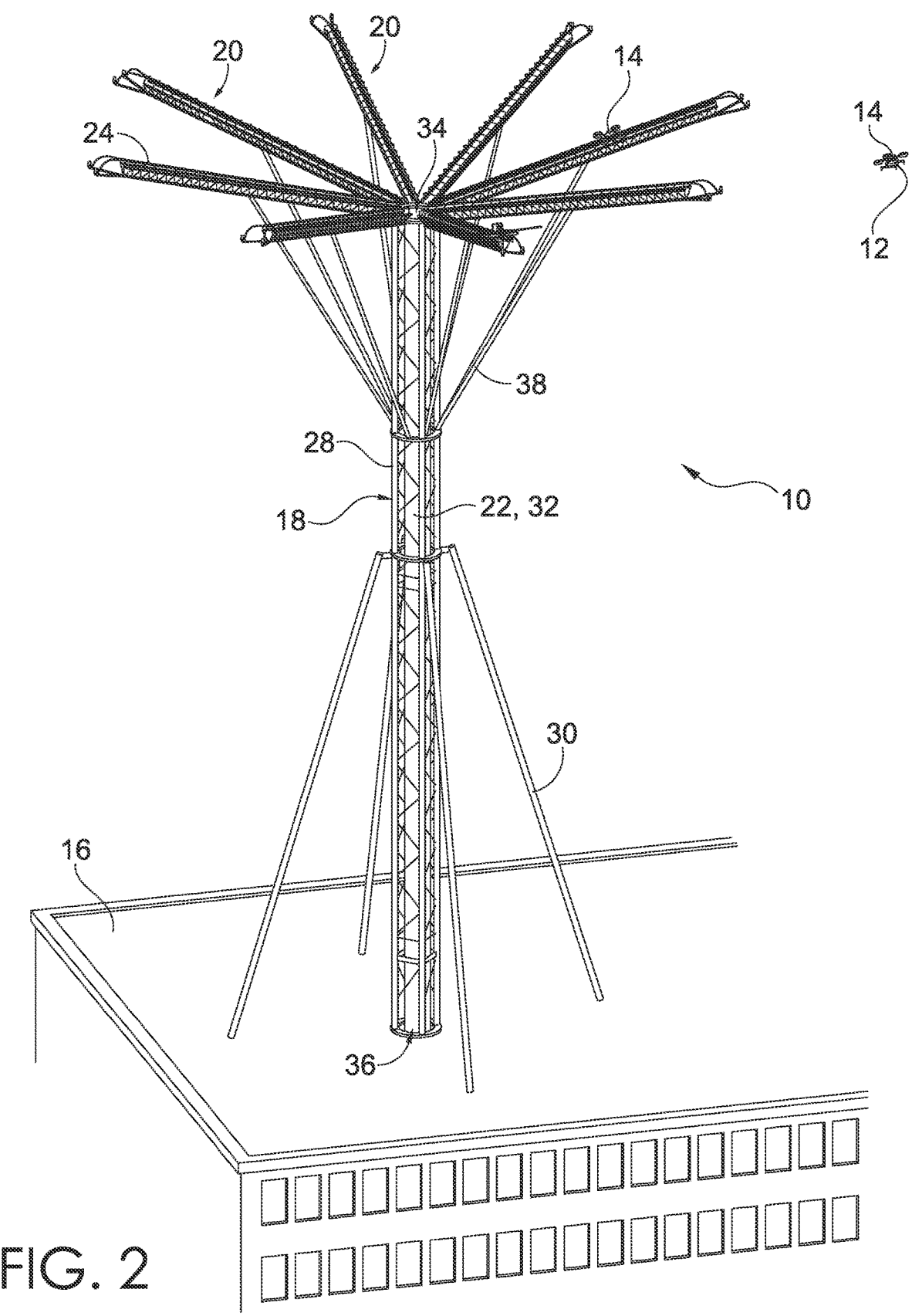
FIG. 2 is a perspective view of a drone delivery system hub in an example operating environment for drone delivery, in accordance with embodiments described herein.

Having this in mind, as depicted in FIG. 2, the present technology describes a drone delivery system hub 10 for facilitating delivery of parcels 12 by UAVs 14. The drone delivery system hub 10 can be placed on top of a building 16, such as existing buildings via a retrofit addition or integrated in buildings during new construction. For example, the drone delivery system hub 10 can fit onto rooftops of shopping malls, logistics warehouses and order fulfillment centers. Additionally or alternatively, the drone delivery system 10 can be placed on access points or be designed as a standalone kiosk. For example, the standalone kiosk can be placed in a parking lot or shipping yard, or alternatively can be portable for use in a plurality of locations as needed.

As depicted in FIG. 2, the drone delivery system hub 10 comprises a center shaft 18 and a plurality of structural arms 20 coupled and/or affixed thereto and extending outward therefrom for facilitating landing, retrieval of the parcels 12, and taking off of one or more of the UAVs 14. Furthermore, the drone delivery system hub 10 comprises a parcel-conveying system 22 supported by the center shaft 18 and one or more drone-conveying systems 24 each supported by one or more of the structural arms 20. As depicted in FIG.

4, the drone delivery system hub 10 can also comprise a link conveyor span 26 selectably rotatable to orientations in which the linking conveyor span 26 extends between at least two of the drone-conveying systems 24.

The center shaft 18 may be of any dimensions and made of any rigid material for fixedly supporting the structural arms 20 at an elevated height. For example, the center shaft 18 can comprise a center shaft frame 28 and a base support 30. The center shaft frame 28 can be any support frame of any size or shape, such as a substantially elongated structure to suspend the structural arms 20 at a desired elevation above the building 16 or other such structures described herein. However, other non-elongated support frames can serve as the center shaft frame 28 without departing from the scope of the technologies described herein. In some embodiments, the center shaft frame 28 can comprise various cross beams and other such structural supports and can be made of a plurality of frame pieces welded and/or mechanically affixed together or can be a single integrally-formed structural frame. The base support 30 is configured to maintain the center shaft frame 28 in a substantially vertical orientation. For example, the center shaft frame 28 can be mounted to an elevated surface of the building 16 and supported by the base support 30, which can likewise include frame members, such as the four angled posts depicted in FIG. 2. However, any base support sufficient to maintain the center shaft frame 28 in a substantially vertical orientation in operation of the drone delivery system hub 10 may be used without departing from the scope of the technology described herein.

In some embodiments, the center shaft 18 further comprises a center chute 32 extending down a length of the center shaft frame 28. For example, the center chute 32 can be a hollow tube, elevator shaft, or the like and can house the parcel-conveying systems 22 therein or can itself serve as the parcel-conveying system 22. In some embodiments, the center chute 32 has an upper opening 34 and a lower opening 36. The upper opening 34 can be at a top of the center chute 32 and the lower opening 36 can be at a bottom of the center chute. Alternatively, the upper opening 34 and the lower opening 36 can be at any locations along the center chute 32 with the upper opening 34 positioned higher than the lower opening 36. For example, as later described herein, there may be multiple upper openings 34 suitable for receiving the parcels 12 at multiple elevations that are higher than the lower opening 36. In some embodiments, the center chute 32 can be covered, such as by a small dome 50 (as depicted in the alternative embodiment of FIG. 5) or the like, to protect the parcels 12 and the center chute 32 from the weather.

The structural arms 20 can extend in a generally upward and radially outward direction from the center shaft 18 or the center shaft frame 28. Furthermore, the structural arms 20 are integrally formed with or otherwise attached to the center shaft 18 or the center shaft frame 28. In some embodiments, the structural arms 20 are fixed in their generally upward and radially outward direction. However, in other embodiments, the structural arms 20 are selectively pivotable relative to the center shaft 18, such that in a locked configuration, the structural arms 20 extend outward in a spoke-like configuration and in an unlocked configuration, the structural arms 20 can be pivoted to mechanically fold inward toward the center shaft 18 and can also independently or cooperatively slide down rails or the like on the center shaft frame 28. This can allow protection of the drone deliver system hub 10 during strong wind conditions and can also be used for repair and maintenance purposes. For example, in some embodiments, at least one of the structural arms 20 can be selectively pivotable toward the center shaft frame 28 and/or selectively slidable down the center shaft frame 28 for maintenance access or repair access by workers located on the roof of the building 16 or at other such lower elevations. This folding and lowering of the structural arms 20 can be accomplished using manual or automated actuators, pulleys, or any suitable systems for pulling the structural arms 20 toward the center shaft 18 and/or cooperatively lowering the structural arms 20 down the center shaft 18.

In addition, one of the structural arms 20 and/or the center shaft frame 28 can comprise arm-supporting spans 38 bracing the structural arms 20 at a desired angle relative to the center shaft frame 28, as depicted in FIG. 2. However, the arm-supporting spans 38 can also fold, selectively pivot along with the structural arms 20, and/or slide along the center shaft frame 28 as described above for the structural arms 20, particularly when required for protecting the delivery system hub 10 during strong wind conditions and/or for providing access to the structural arms 20, the arm-supporting spans, and/or any components along the structural arms 20 for maintenance or repair purposes.

The parcel-conveying system 22 can be a conveying system configured for substantially vertical conveyance of the parcels 12, the UAVs 14, or other such parcels or physical items. The conveyance can be motorized conveying and/or can utilize gravity (e.g., such as in embodiments where the parcel-conveying system 22 is the center chute 32) or some additional or alternative manual conveying methods. For example, the parcel-conveying system 22 can comprise any type of elevator (e.g., a set of cargo elevators), one or more spiral conveyors, one or more L-shaped platforms or conveyor lifts, or other vertical conveyor devices used to move parcels automatically from one elevation to another. The parcels 12 can be fed through the lower opening 36 via a bottom or lower location of the parcel-conveying system 22, either loaded directly thereon or through a connected conveyor system, and then the parcel-conveying system 22 can convey the parcels 12 upward to the upper opening 34 to be received by one of the UAVs 14. Likewise, the parcel-conveying system 22 can receive at the upper opening 34 any of the parcels 12 from one of the UAVs 14 to be conveyed downward to the lower opening 36, which could be within the building 16 and/or on an upper surface or roof of the building 16, for example. In some embodiments, the parcel-conveying system 22 can also serve to convey any of the UAVs 14 down the center shaft frame 28, such as for periodic maintenance checks or repairs.

Figure 3:
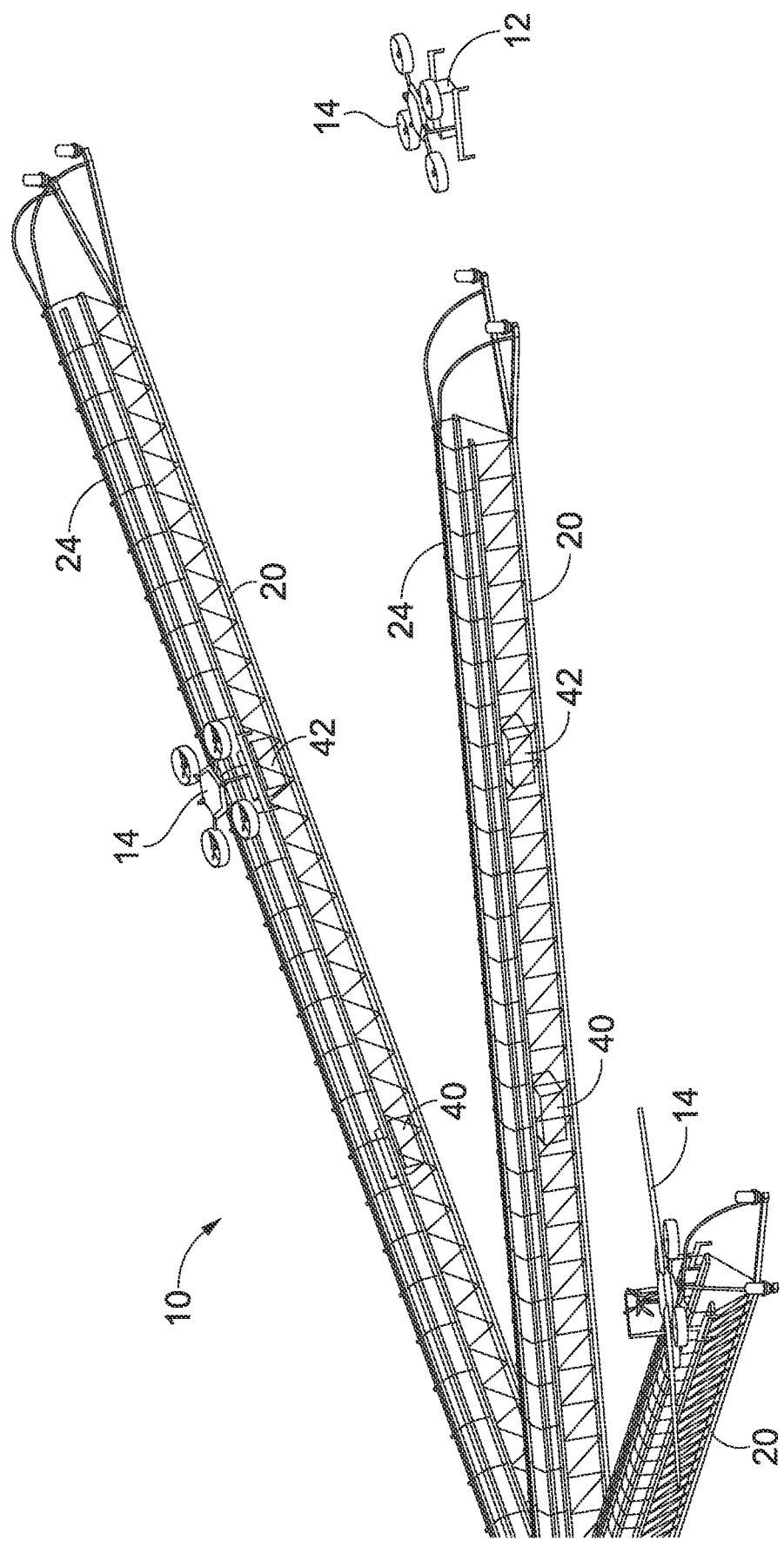
FIG. 3 is a perspective view of structural arms and drone-conveying systems of the drone delivery system hub of FIG. 2, in accordance with embodiments described herein.
Figure 4:
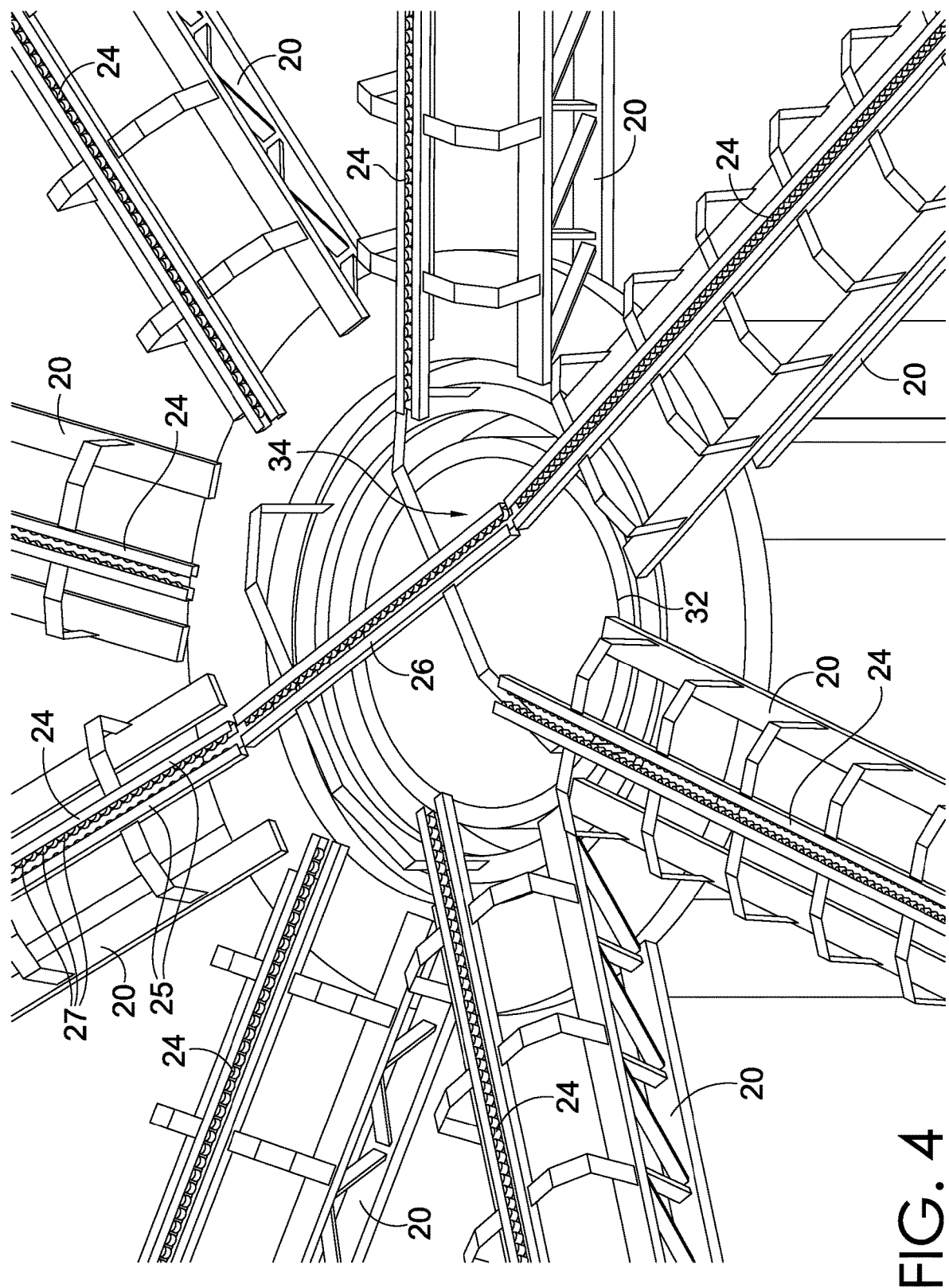
FIG. 4 is a top perspective view of a linking conveyor span selectively linking the structural arms of the drone delivery system hub of FIG. 2, in accordance with embodiments described herein.

As depicted in FIGS. 2-3, the drone-conveying systems 24 are each supported by at least one of the structural arms 20. One or more of the drone-conveying systems 24 are operable to receive and convey one or more of the UAVs 14 along a length of one or more of the structural arms 20. The drone-conveying systems 24 can comprise, for example, a pair of opposing rails 25 laterally spaced apart and power rollers 27 positioned within the opposing rails 25, as depicted in FIG. 4. Some examples of drone-conveying systems 24 are described as conveyors 440 in U.S. Pat. Nos. 10,453,022, 10,460,281, and 10,586,201, each of which are incorporated by reference herein in their entirety. In some embodiments, at least one of the plurality of drone-conveying systems are operable to catapult the one or more UAVs from the one of the plurality of structural arms upon take-off, such as via accelerated speed of the power rollers or other such drone-conveying systems 24.

As schematically depicted in FIG. 3, some embodiments of the drone delivery system hub 10 further comprise autonomous drone diagnosis systems 40 located along one or more of the structural arms 20. The autonomous diagnosis systems 40 are configured to automatically run diagnostic checks and/or pre-flight checks of the UAVs 14. For example, the autonomous diagnosis systems may be the same or equivalent to the autonomous drone diagnosis systems described in U.S. patent application Ser. No. 16/414,400 filed on May 16, 2019, which is incorporated by reference herein in its entirety. In some embodiments, various components of any one of the drone diagnosis systems 40 can be distributed along one of the structural arms 20, such as various sensors, controllers, processors, memory, and the like. Furthermore, in some embodiments, one or more of the components of the drone diagnosis systems 40 can be located remotely from the structural arms 20, while other components thereof such as various sensors or communication components remain on one of the structural arms 20.

Figure 5:
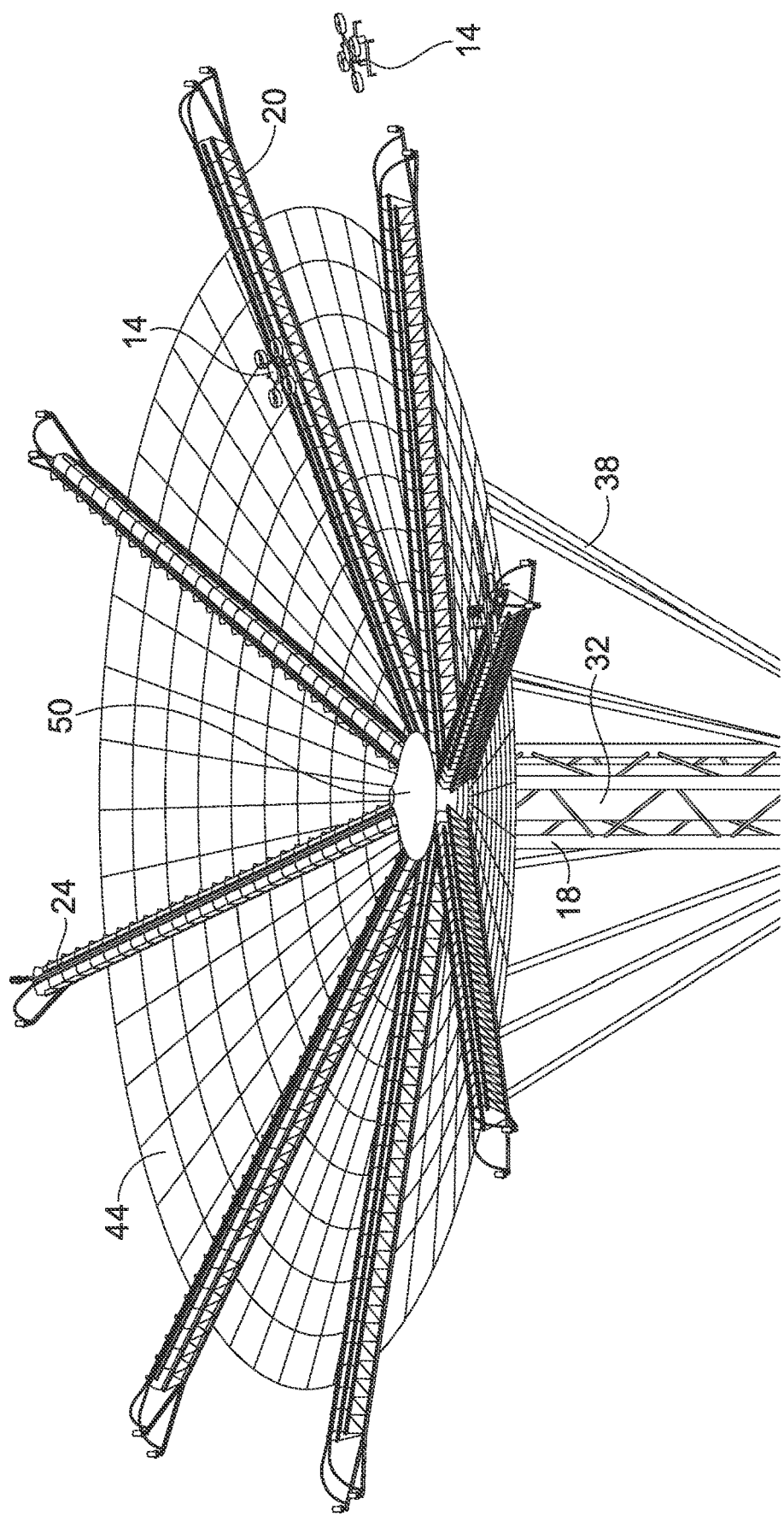
FIG. 5 is a perspective view of an alternative embodiment of the drone delivery system hub with a folding solar array, in accordance with embodiments described herein.

In some embodiments, as depicted in FIG. 3, the drone delivery system hub 10 further includes battery charging stations 42 along one or more of the plurality of structural arms 20. The battery charging stations 42 are operable for storing and charging one or more UAV batteries from the UAVs 14. In some embodiments, the battery charging stations 42 can be powered via traditional wires extending to a traditional power source, such as connected to the electric grid. However, in some alternative embodiments, the battery charging stations 42 are electrically coupled to solar panels 44. For example, the solar panels 44 can include a folding solar array as depicted in FIG. 5. Additionally or alternatively, wind turbines can be used to generate power for the battery charging stations 42 to charge the UAV batteries.

Figure 6A:
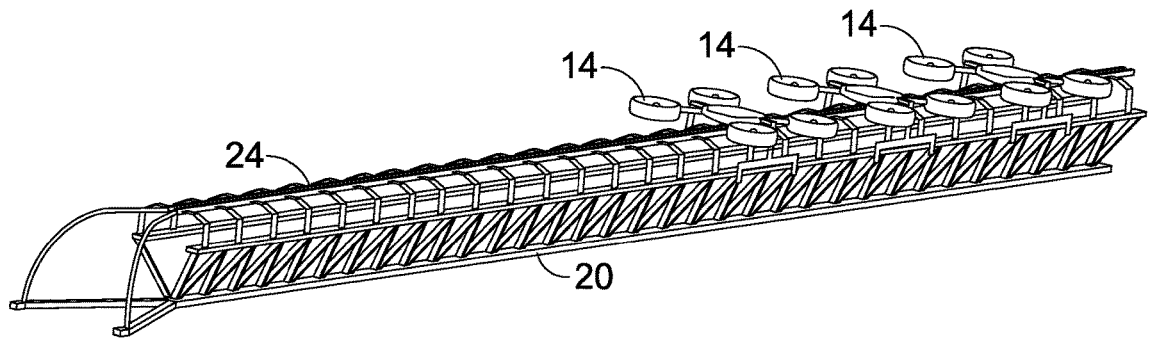
FIG. 6A is a perspective view of drone storage of a plurality of unmanned aerial vehicles (UAVs) on one of the structural arms of FIG. 3, in accordance with embodiments described herein.
Figure 6B:
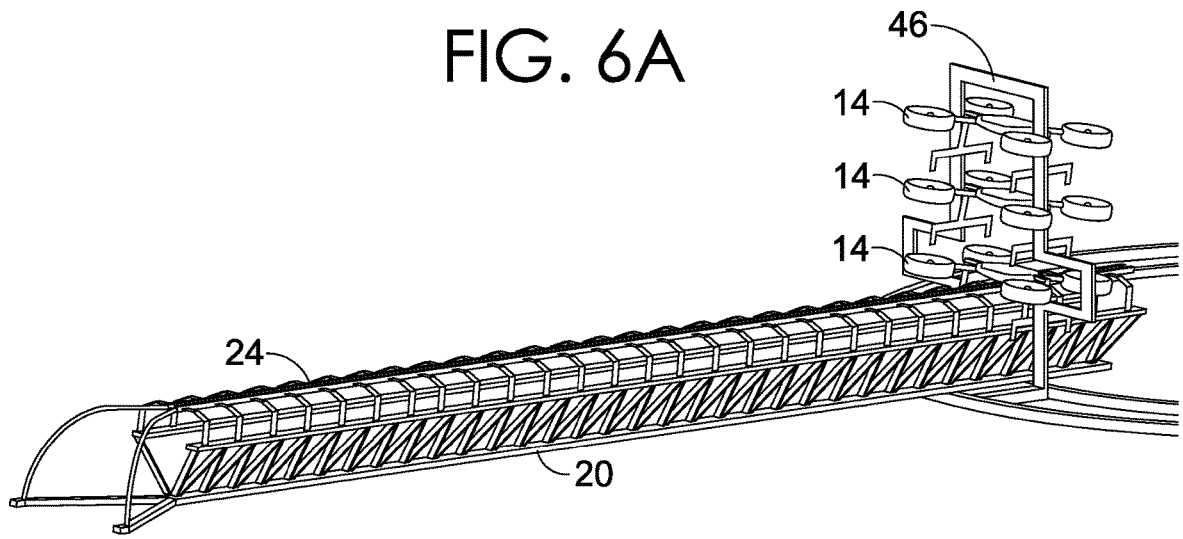
FIG. 6B is a perspective view of an alternative embodiment of the drone delivery system hub with a drone storage system comprising an upward-protruding drone-storing rack for storing a plurality of UAVs, in accordance with embodiments described herein.
Figure 6C:
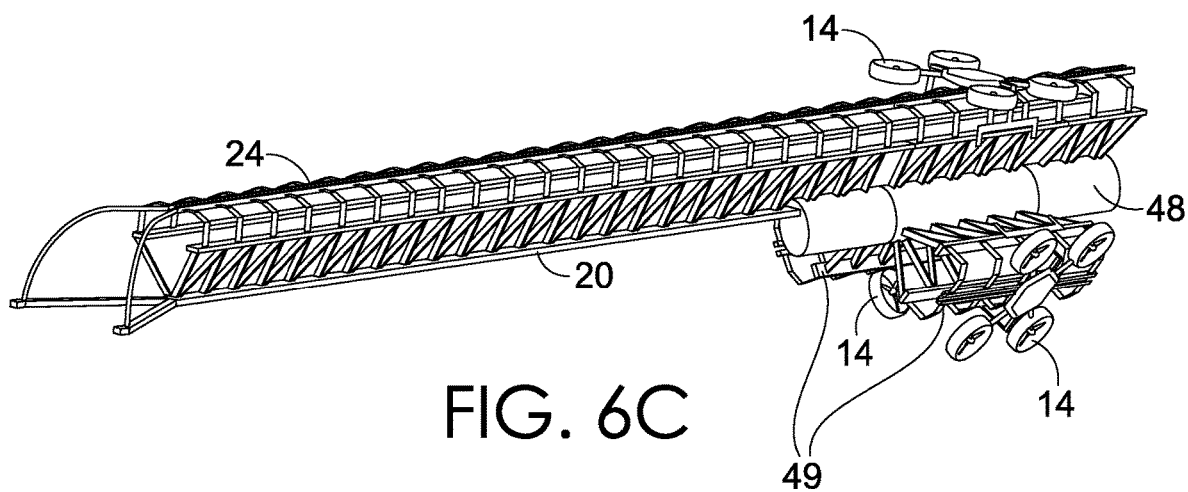
FIG. 6C is a perspective view of another alternative embodiment of the drone delivery system hub with a drone storage system comprising rotating segments for selectively storing a plurality of UAVs, in accordance with embodiments described herein.

A plurality of UAV storage systems are depicted in FIGS. 6A-6C. In each of the storage systems depicted herein, the UAVs 14 may be stored before or after the flight checks and battery swaps are executed (to reduce time between mission received and UAV launch). Alternatively, the UAVs 14 may be stored with depleted batteries that are charged while in storage, and flight checks may be executed right before takeoff. FIG. 6A depicts storing a plurality of the UAVs 14 on one of the structural arms 20. This advantageously provides for UAV storage without requiring additional structure. However, this configuration also temporarily blocks the use of one or more structural arms for receiving or launching of the UAVs therefrom while it is used for storage. Thus, as depicted in FIGS. 6B and 6C, in some alternative embodiments of the invention, the drone delivery system hub 10 may further comprise a first drone storage system 46 and/or a second drone storage system 48 on one or more of the structural arms 20.

For example, as depicted in FIG. 6B, the first drone storage system 46 can feature an upward-extending storage rack supported by one of the structural arms 20. However, in some embodiments, the first drone storage system 46 can additionally or alternatively include a downward-extending storage rack supported by one of the structural arms 20. In either case, the UAVs 14 are stored out of the way until required. Once a mission is received by any of the controllers described herein, one of the UAVs can be dropped or raised via the storage rack (i.e., the first drone storage system 46). As depicted in FIG. 6B, the first drone storage system 46 can include one or more rails holding the UAVs thereon from either side and can further include a wider opening proximate to the structural arm to allow the UAV's propellers to slide horizontally along the structural arm when conveyed past the first drone storage system 46.

In another example embodiment, as depicted in FIG.6C, the second drone storage system 48 can be rotatably attached to any one or more of the structural arms 20 and operable to rotatable about an axis extending a length of that corresponding structural arm. Furthermore, the second drone storage system 48 may comprise a rotation attachment shaft and a plurality of rail segments 49 spaced apart from each other about the rotation attachment shaft and/or the corresponding structural arm to cooperatively rotate about the rotation attachment shaft axis and/or an axis extending the length of the structural arm. For example, the rotation attachment shaft can include one or more fixed portions and one rotating portion rotatably attached to the fixed portions. The fixed portions can be fixedly attached to one of the structural arms, as depicted in FIG. 6C. Note that in some embodiments, the rail segments 49 can be replaced with other segments of a UAV-conveying system without departing from the scope of the technology described herein.

In use, the rail segments 49 of the second drone storage system 48 can each be selectively aligned, upon rotation about the rotation attachment shaft and/or the corresponding structural arm, with one of the drone-conveying systems 24, such as one of the pairs of opposing rails of the drone-conveying systems 24, as described above. Thus, as depicted in FIG. 6C some of the UAVs 14 can be stored below one or more of the structural arms 20 while others can simultaneously be conveyed, via one of the drone-conveying systems 24 and a first one of the rail segments 49 of the second drone storage system 48 that are aligned therewith, to the linking conveyor span 26 or to an outer end of the structural arm for take-off from. Then, the second drone storage system 48 can rotate about the structural arm and/or the rotation attachment shaft such that one of the previously-stored UAVs 14 can be conveyed via a second one of the rail segments 49 of the second drone storage system 48 and one of the drone-conveying systems 24 and/or the linking conveyor span 26.

As depicted in FIG. 4, the linking conveyor span 26 is selectably rotatable to orientations extending between at least two of the drone-conveying systems 24 and is operable to convey one or more of the UAVs 14 between the at least two of the drone-conveying systems 24. In some embodiments, the linking conveyor span 26 is rotatably fixed relative to the center axis of the center shaft frame 18 and above the upper opening of the center chute 32 and/or a portion of the parcel-conveying system 22, thus allowing the UAVs 14 located on the linking conveyor span 26 to retrieve one of the parcels 12 from the center shaft 18 and/or to deposit one of the parcels 12 into the center shaft 18 via the center chute 32 and/or the parcel-conveying system 22. The central position and the rotatability of the linking conveyor span 26 allows the linking conveyor span 26 to selectably convey the UAVs between any two or more of the drone-conveying systems 24 and their corresponding structural arms 20. Specifically, the linking conveyor span 26 can comprise a pair of opposing rails laterally spaced apart and power rollers positioned within the opposing rails as with the drone-conveying systems 24 described above.

Note that the linking conveyor span 26 is just one example device for directing the UAVs 14 to different ones of the structural arms 20. In some embodiments (not shown), the linking conveyor span 26 can be omitted entirely, and portions of the drone-conveying systems 24 and/or other alternative devices can be used to convey the UAVs 14 to the center chute 32 and/or to other ones of the structural arms 20. For example, in one embodiment where the linking conveyor span 26 is omitted, the UAVs 14 can power up to hover or fly above the center chute 32 for dropping off or retrieving parcels. In another example embodiment, the structural arms 20 and/or portions of the drone-conveying systems 24 thereon can intersect in such a way that no rotation is necessary to redirect the UAVs 14 to other ones of the structural arms 20. For example, an intersecting point of the drone-conveying systems 24 can be located over the center chute 32 and can be configured with directing mechanisms (not shown) for directing any of the UAVs 14 from the intersecting point to one of the drone-conveying systems 24 of one of the structural arms. Alternatively, the linking conveyor span 26 can be fixed and the structural arms 20 can be rotatably attached to the center shaft 18, such that the structural arms 20 can rotate to provide for a rapid launch of multiple UAVs 14 in desired directions.

In some embodiments, the drone delivery system hub 10 further comprises one or more controllers, such as computing device 1 depicted in FIG. 1, for controlling actuation of the parcel-conveying system 22, the drone-conveying system 24, and/or the linking conveyor span 26. For example, the controllers may include a parcel-conveying controller configured and/or programmed to operate the parcel-conveying system 22 and/or to identify to other controllers and/or the UAVs 14 information regarding the parcels being conveyed thereby and/or their destinations. Furthermore, in some example embodiments, the controllers can include a drone-conveying controller programmed and/or configured to operate the drone-conveying system 24, including direction, speed, and starting or stopping of the drone-conveying system 24 on one or more of the structural arms 20. In some embodiments, the controllers can further include a linking conveyor span controller configured and/or programmed to rotate the linking conveyor span 26 based a destination of a one of the UAVs 14 positioned on the linking conveyor span 26, wind conditions, and/or statuses of other incoming or outgoing ones of the UAVs 14. The controllers can contain one or more sensors and/or may contain both physically-connected and communicably-coupled components for physical actuation, communication, sensing, and the like. For example, sensors for indicating global and/or relative position of one or more of the UAVs 14 on the drone conveying system hub 10 may be included and/or communicably coupled with one or more of the controllers described herein.

Figure 7:
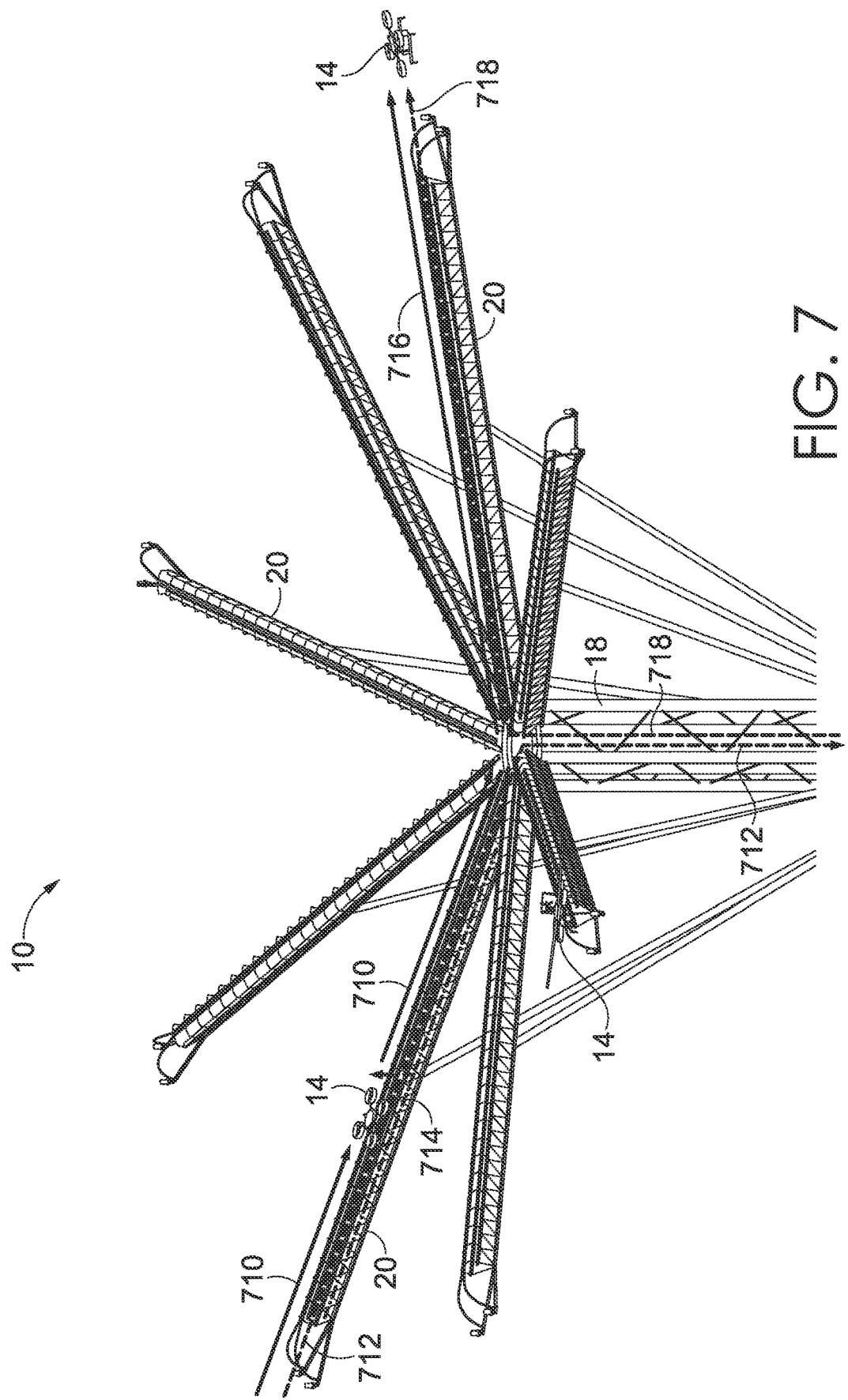
FIG. 7 is a perspective view of the drone delivery system hub of FIG. 2, illustrating example conveying routes for the UAVs and parcels being delivered by the UAVs, in accordance with embodiments described herein.

An example operation of the drone conveying system hub 10 is depicted in FIG. 7. Path 710 depicts a landing and subsequent deceleration path of one of the UAVs 14. Path 712 depicts a path of one of the parcels 12 as it is carried along one of the structural arms 20 to the linking conveyor span 26, and dropped into the center chute 32 and conveyed via the parcel-conveying system 22 down the center shaft 18. Note that, because the parcel remains with the UAV during landing and deceleration, the parcel's path 712 and the UAVs landing path 710 are parallel or identical to each other until the parcel is dropped into the center chute 32.

Path 714 depicts a battery swap path and/or location along one of the structural arms 20. Although only one arrow is illustrated for path 714, the battery charging stations and battery swap locations can be anywhere along path 714. Likewise, in some embodiments, the battery charging station and/or components for conveying batteries from one of the battery charging stations to a particular battery swapping location can also be included in drone conveying system hub 10 on any of the structural arms 20. Likewise, an autonomous pre-flight check can be conducted at any point along the paths depicted herein along the structural arms 20.

Furthermore, as depicted in FIG. 7, the path 716 depicts a take-off and acceleration path of one of the UAVs 14 along another one of the structural arms 20. Path 718 depicts a path of another one of the parcels 12 as it is carried up the center chute via the parcel-conveying system 22 and then picked up by one of the UAVs 14 located on the linking conveyor span 26 and carried along another one of the structural arms 20 to an end thereof for take-off and subsequent delivery. Note that, because the parcel remains with the UAV during take-off and acceleration, the parcel's path 718 and the UAV's take-off path 716 are parallel or identical to each other after the parcel is received from the center chute 32.

Figure 11:
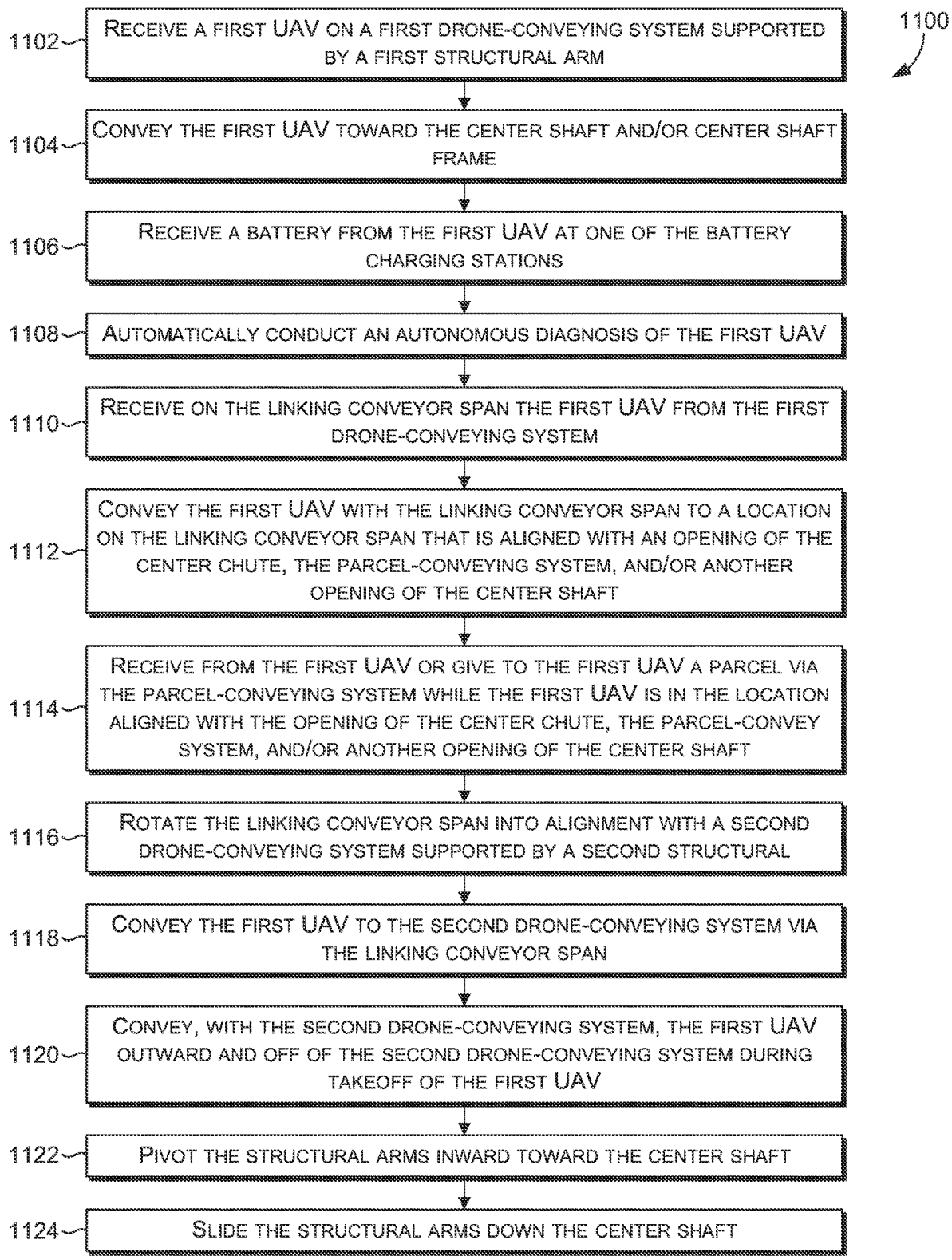
FIG. 11 is a flow chart of a method of sending for take-off and receiving for landing UAVs via a drone delivery system hub, in accordance with embodiments hereof.

As depicted in FIG. 11, the drone conveying system hub 10 described above can be used in a method 1100 for sending for take-off and receiving for landing one or more of the UAVs 14. At least a portion of the steps of the method 1100 in accordance with various embodiments of the present invention are listed in FIG. 11. The steps may be performed in the order as shown in FIG. 11, or they may be performed in a different order. Further, some steps may be performed concurrently as opposed to sequentially. In addition, some steps may be omitted. Still further, embodiments of the present invention may be performed using systems other than the systems and apparatuses described herein without departing from the scope of the technology described herein.

The method 1100 of sending for take-off and receiving for landing one or more of the UAVs 14 comprises the steps of receiving a first UAV on a first drone-conveying system, as depicted in block 1102 and conveying the first UAV toward the center shaft 18 and/or center shaft frame 28, as depicted in block 1104. The first UAV may be any of the UAVs 14 described above and the first drone-conveying system can be any of the drone-conveying systems 24 described above. Receiving the first UAV can occur upon the first UAV landing onto and engaging with or being engaged with the first drone-conveying system. Once the first UAV is engaged with the first drone-conveying system, the first drone-conveying system can automatically begin conveying the first UAV toward the center shaft 18. This automatic conveying can be accomplished using any combination of sensors, controllers, motors, and the like.

In some embodiments, the method 1100 can also comprise the steps of receiving a battery from the first UAV at one of the battery charging stations, as depicted in block 1106, and automatically conducting an autonomous diagnosis of the first UAV, as depicted in block 1108. These steps can occur during the conveying step 1104. Specifically, as described above, the battery charging stations can be located on any or all of the structural arms supporting the drone-conveying systems. The first UAV can therefore either receive a signal to release its battery at a location directly over a specific one or a first or last open one of the battery charging stations, or the battery charging stations can be programmed to retrieve the first UAV's battery therefrom. Likewise, the autonomous diagnosis or preflight check can be programmed to occur when the first UAV reaches, via the first drone-conveying system, the autonomous drone diagnosis system 40 located on the one of the structural arms supporting the first drone-conveying system. The first UAV can either stop, via the first drone-conveying system, at one of the battery charging stations and/or the autonomous drone diagnosis system for steps 1106 and/or 1108, or the first drone-conveying system can move at a speed that allows for steps 1106 and/or 1108 to occur while the first UAV continues to be conveyed by the first drone-conveying system.

The method 1100 further includes the steps of receiving on the linking conveyor span 26 the first UAV from the first drone-conveying system, as depicted in block 1110. As noted above, the linking conveyor span 26 is rotatable and alignable with any of the drone-conveying systems 24, such that, for example, the conveying of the first UAV past an inner-most end of the first drone-conveying system can deposit the first UAV directly onto the linking conveyor span 26. In some embodiments, at least a portion of the linking conveyor span 26 is located or rotatably locatable over an opening of the center chute, the parcel-conveying system 22, and/or any opening of the center shaft 18 for receiving one of the parcels from or delivering one of the parcels to the first UAV.

Furthermore, the method 1100 comprises conveying the first UAV with the linking conveyor span to a location on the linking conveyor span that is aligned with an opening of the center chute, the parcel-conveying system 22, and/or any opening of the center shaft 18, as depicted in block 1112, for receiving one of the parcels from or delivering one or the parcels to the first UAV. Specifically, the method 1100 can also comprise receiving from the first UAV or giving to the first UAV a parcel via the parcel-conveying system 22 while the first UAV is in the location aligned with the opening of the center chute, the parcel-conveying system 22, and/or any opening of the center shaft 18, as depicted in block 1114.

In some embodiments, the method 1100 further comprises rotating the linking conveyor span 26 into alignment with a second drone-conveying system supported by a second structural arm coupled and/or affixed to and extending outward from the center shaft 18 and/or the center shaft frame 28, as depicted in block 1116. The second UAV may be any of the UAVs 14 described above (other than the first UAV) and the second drone-conveying system can be any of the drone-conveying systems 24 described above (other than the first drone-conveying system). The method 1100 can also comprise a step of conveying the first UAV to the second drone-conveying system via the linking conveyor span 26, as depicted in block 1118.

The method 1100 can also comprise the steps of conveying, with the second drone-conveying system, the first UAV outward and off of the second drone-conveying system during takeoff of the first UAV, as depicted in block 1120. The speed at which the first UAV or any of the UAVs are conveyed off of the drone-conveying systems can be sufficient to substantially launch or otherwise slingshot the first UAV or any of the UAVs outward and upward at a desired take-off speed.

In some embodiments, the method 1100 can further comprise the steps of pivoting the structural arms 20 inward toward the center shaft 18, as depicted in block 1122, and/or sliding the structural arms 20 down the center shaft 18, as depicted in block 1124. These steps can be achieved in a manual or automated fashion. As noted above, step 1122 can be accomplished via the structural arms 20 selectively pivoting relative to the center shaft 18 from the locked configuration (e.g., radially outward and angled slightly upward from the center shaft 18 for take-off and landing of the UAVs 14), to a folded configuration that is achieved when the structural arms 20 are mechanically folded toward and/or against the center shaft 18. Likewise, step 1124 can be accomplished when the structural arms 20 are independently or cooperatively slid down rails or the like along the center shaft frame 28. This can allow protection of the drone deliver system hub 10 during strong wind conditions and can also be used for repair and maintenance purposes. For example, once the structural arms 20 are lowered to a roof of the building 16, maintenance workers can access various control systems and conveying systems or the like on the structural arms 20 without requiring the workers to climb to dangerous heights. Note that one or both of steps 1122 and 1124 can be omitted without departing from the scope of the technology described herein.

Figure 8:
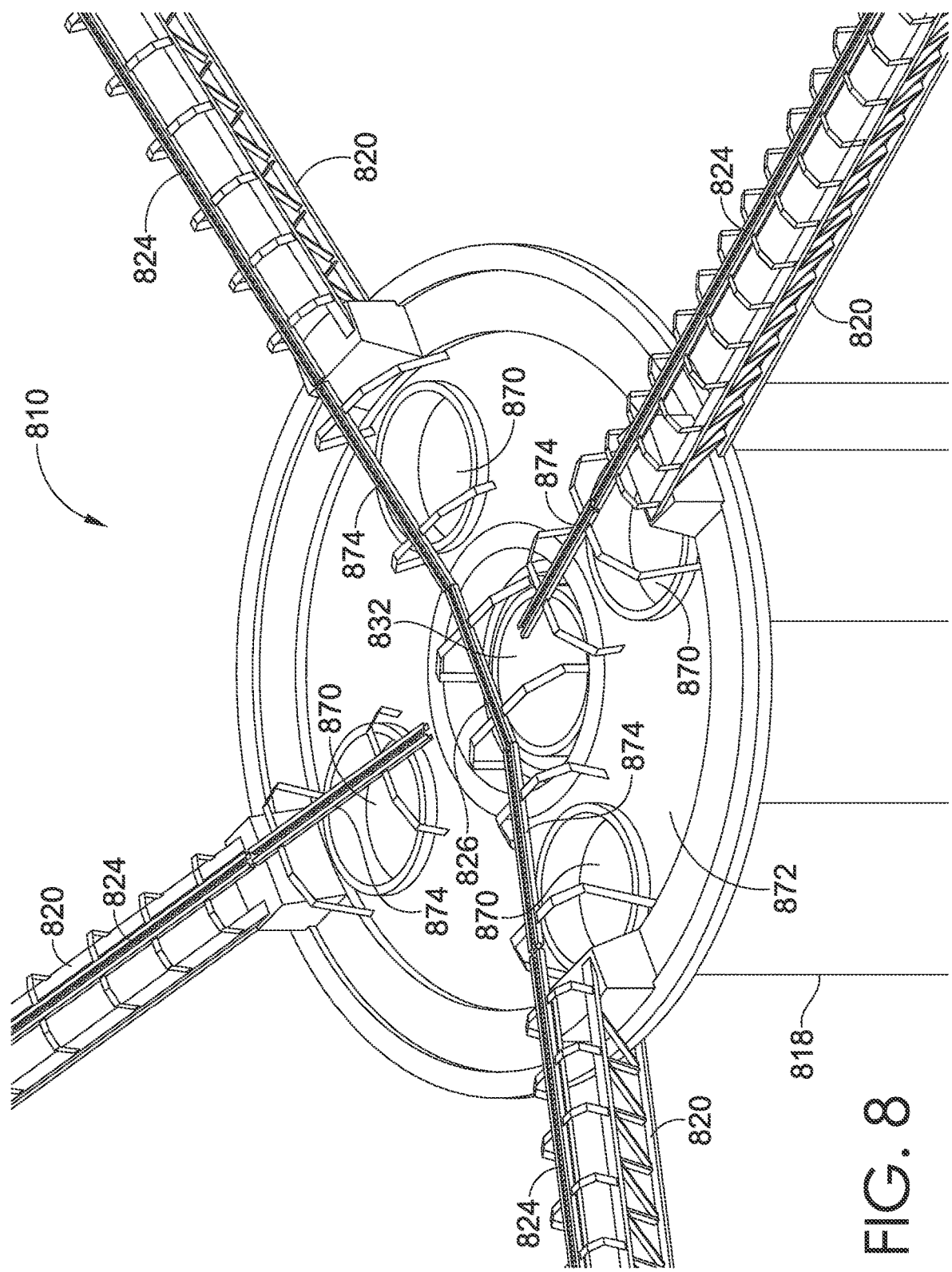
FIG. 8 is a top perspective view of an alternative embodiment of the drone deliver system hub with a plurality of outer chutes, as well as rotatable spoke rails for selectively aligning any of the UAVs with one of the outer chutes, in accordance with embodiments described herein.

In some alternative embodiments, as depicted in FIG. 8, a drone delivery system hub 810 is similar to the drone delivery system hub 10 described above, except that the center shaft 18 is substituted with a center shaft 818. The drone delivery system hub 810 can include, for example, structural arms 820 that are substantially identical to the structural arms 20 described above. The center shaft 818 is substantially identical to the center shaft 18 except that it further comprises: a center chute 832 and a plurality of outer chutes 870 positioned around or proximate to the center chute 832. Furthermore, in some alternative embodiments, the center chute 832 can be omitted, with the plurality of outer chutes 870 remaining. The center chute 832 and the plurality of outer chutes 870 each extend down a center shaft frame that is substantially identical or similar to the center shaft frame 28 shown in FIG. 2. Note that the drone-conveying systems 824 can be located within each of the chutes 832,870 or each of the chutes 832,870 can be replaced with one or more drone-conveying systems 824. Alternatively, the chutes 832,870 themselves can serve as the drone-conveying systems 824, simply allowing the parcel to drop therein and fall downward to a desired location on or within the structure or building (e.g., the building 16) to which the drone deliver system hub 810 is attached.

Furthermore, in some embodiments, the drone delivery system hub 810 further comprises a ring 872 having spoke rails 874 cooperatively attached thereto, the ring 872 being rotatable to position the spoke rails 874 at locations above different ones of the outer chutes 870. Thus, some methods described herein, similar to the method 1100 described above, can further comprise the step of cooperatively rotating the ring 872 and its spoke rails 874 such that one of the spoke rails 874 aligns with one of the outer chutes 870 for drop-off or pick-up of a parcel via that one of the outer chutes 870. Furthermore, when positioned above one of the outer chutes 870, the spoke rails 874 also can individually extend between one of the drone-conveying systems 824 and a linking conveyor span 826, which are substantially identical to the drone-conveying systems 24 and the linking conveyor span 26, respectively. The linking conveyor span 826 can likewise still rotate to align with different ones of the spoke rails 874 for conveyance therebetween and can allow ones of the UAVs 14 positioned thereon to send to and receive parcels from the drone conveying system 824 of the center chute 832. The linking conveyor span 826 can rotate in the same or opposite rotational direction as the ring 872.

Advantageously, by using multiple rotating portions, the configuration in FIG. 8 allows for carrying several UAVs from and to the various structural arms simultaneously without having one central choke point, thus alleviating congestion at the center chute 832 and increasing throughput of the parcels 12 and the UAVs 14. Furthermore, by having different chutes 832,870 through which the parcels 12 may be conveyed, as well as spoke rails 874 to rotate the UAVs 14 to openings of the different chutes 832,870, larger amounts of parcel and UAV traffic or throughput may be processed simultaneously in comparison to having a single center chute 32. However, note that the addition of the outer chutes 870 can be utilized without the ring 872 and/or the spoke rails 874 without departing from the scope of the technology described herein. For example, in another alternative embodiment, either the linking conveyor span 826 or one or more of the drone-conveying systems 824 can extend over the outer chutes 870 for the UAVs 14 to deposit or pick up additional parcels therefrom, omitting the ring 872 and spoke rails 874.

Figure 9:
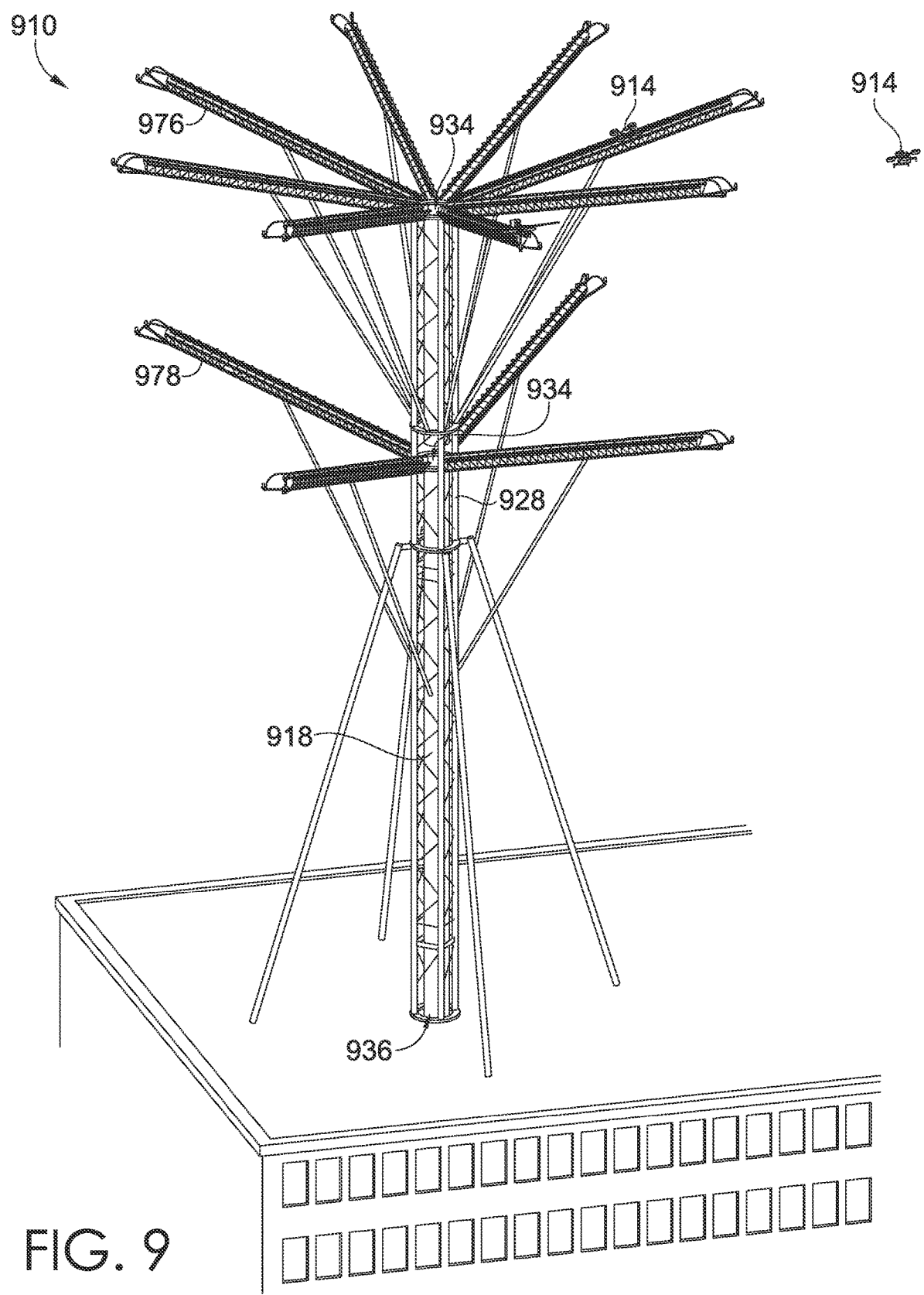
FIG. 9 is a perspective view of an alternative embodiment of a drone delivery system hub with multiple elevation levels of structural arms depicted in an example operating environment for drone delivery, in accordance with embodiments described herein.

In yet another alternative embodiment, as depicted in FIG. 9, a drone delivery system hub 910 is substantially identical to the drone delivery system hub 10, except that the structural arms 920 comprise both a plurality of upper structural arms 976 and a plurality of lower structural arms 978. The upper structural arms 976 are located at a higher elevation on a center shaft 918 or center shaft frame 928 than the lower structural arms 978. Note that the center shaft 918 and the center shaft frame 928 can be similar or substantially identical to the center shaft 18 and the center shaft frame 28 described in other embodiments above. The upper structural arms 976 and the lower structural arms 978 can support drone-conveying systems thereon, as described above, as well as the battery charging stations and/or the autonomous drone diagnostic systems described above. The drone deliver system hub 910 can further include upper openings 934 and at least one lower opening 936, which are similar to the upper openings 34 and the lower openings 36 described above. The upper openings 934 can include a first upper opening corresponding to the upper structural arms 976 for sending and receiving of parcels to and from UAVs 914 and a second upper opening corresponding to the lower structural arms 978 for sending and receiving of parcels to and from the UAVs 914. Note that the UAVs 914 can be similar or identical to the UAVs 14 described above. Furthermore, at each of the first and second upper openings, there can also be first and second linking conveyor spans (not shown), each similar to the linking conveyor span 26 described above and having the same functioning thereof. Any combination of the components located at a top of the drone delivery system hub 10 can be duplicated at various elevations along the center shaft 18, as depicted in the drone delivery system hub 910 in FIG. 9, without departing from the scope of the technology described herein. Specifically, alternative embodiments can feature three sets, four sets, or more sets of the structural arms 20 or 920 at different elevations from each other.

Figure 10:
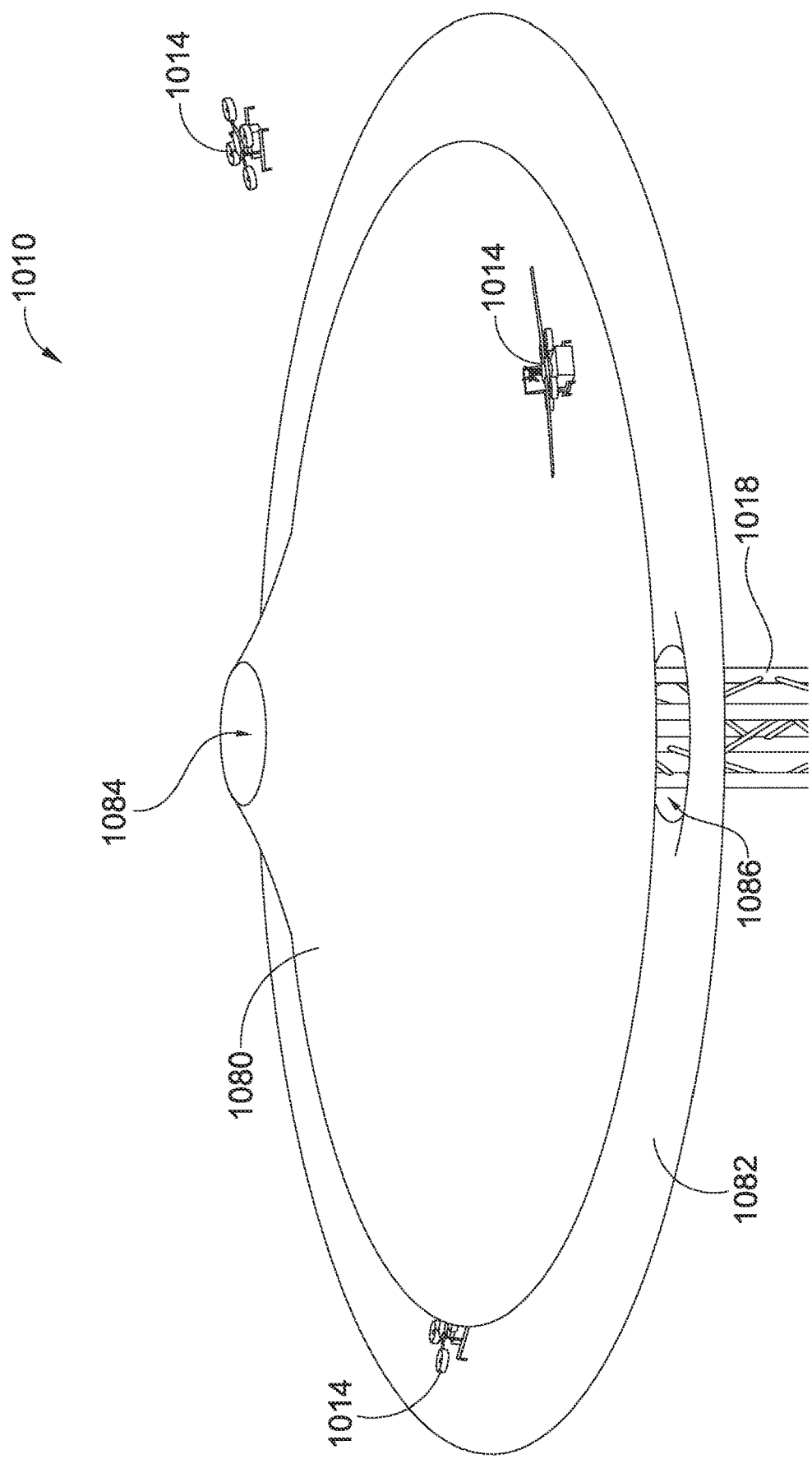
FIG. 10 is a perspective view of another alternative embodiment of a drone delivery system hub utilizing take-off and landing cones, in accordance with embodiments described herein.

In one alternative embodiment, as depicted in FIG. 10, a drone deliver system hub 1010 comprises a center shaft 1018 similar to the center shaft 18 described above, but the structural arms 20 and the drone-conveying systems 24 are omitted and instead replaced with a take-off cone 1080 and a landing cone 1082. The take-off cone 1080 can have an inner surface, an outer surface, a bottom opening, and a top opening 1084 instead of a cone point. The take-off cone further has a gradually widening cross-section from the top opening 1084 to the bottom opening, as depicted in FIG. 10. In some embodiments, the take-off cone's outer surface is substantially concave along the cone's slant.

The take-off cone 1080 can be attached with its top opening 1084 directly above the center shaft 1018 or alternatively the center shaft 1018 can extend through the top opening 1084 of the take-off cone. The take-off cone 1080 is operable to receive UAVs 1014 from the center shaft 1018 or conveyor systems thereof through the top opening 1084 of the take-off cone 1080. In some embodiments, a UAV vertical conveyor system 1090 within the center shaft 1018 can have one or more mechanisms for pushing the UAVs 1014 outward from the top opening 1084 of the take-off cone 1080. For example, an omnidirectional ball mat or the like can be operable for turning and/or pushing the UAVs 1014 through the top opening 1084 of the take-off cone 1080 in programmed directions corresponding with each UAV's desired flight path. Then gravity can cause the UAVs 1014 to slide down the outer surface of the take-off cone 1080. Thus, rather than a powered take-off aid, the take-off cone's shape acts as a low friction slide, giving the UAVs 1014 a sloped ramp to take impulse. Note that other downward-sloped, low-friction structures using gravity in this same manner for UAV take-off can be used in place of the take-off cone 1080 without departing from the scope of the technology described herein.

The landing cone 1082 can be inverted in comparison to the take-off cone 1080. Specifically, the landing cone 1082 can have an inner surface, an outer surface, a top opening, and a bottom opening 1086 instead of a cone point. The landing cone 1082 further has a gradually widening cross-section from the bottom opening 1086 up to its top opening, as depicted in FIG. 10. In some embodiments, the landing cone's inner surface is substantially convex along the landing cone's slant. The landing cone 1082 can be located above the take-off cone 1080, but is depicted herein as being located below the take-off cone 1080, with the center shaft 1018 extending through at least the bottom opening 1086 of the landing cone 1082.

The landing cone 1082 is operable to receive landing ones of the UAVs 1014, with gravity causing those UAVs 1014 to slide to the center shaft 1018 to be conveyed downward for loading or unloading of parcels, battery charging or battery swaps, and/or to run diagnostics or repairs thereon. Furthermore, in embodiments in which the landing cone 1082 is mounted below the take-off cone 1080, the landing cone 1082 can have a larger diameter at its top opening than a diameter of the bottom opening of the take-off cone 1080. This provides safety for any of the UAVs 1014 failing to take-off once they reach an outer-most edge of the take-off cone 1080. The failed UAV would simply fall onto the landing cone 1082 and be conveyed down the center shaft 1018 for repairs.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

In some embodiments, a drone delivery system hub for facilitating parcel delivery comprises the following components—a center support frame; a parcel-conveying system supported by the center support frame; a plurality of structural arms coupled to and extending outward from the center support frame; a plurality of drone-conveying systems each supported by at least one of the structural arms and operable to convey one or more unmanned aerial vehicles (UAVs) along a length of one or more of the plurality of structural arms; and a linking conveyor span selectably extending between at least two of the plurality of drone-conveying systems and at least partially operable to convey the one or more UAVs between the at least two of the plurality of drone-conveying systems.

In any combination of the above embodiments of the drone delivery system hub, it further comprises at least one controller of the linking conveyor span, wherein the controller is programmed to rotate the linking conveyor span based on at least one of the following: a destination of one of the one or more UAVs positioned on the linking conveyor span, wind conditions, and statuses of other incoming or outgoing ones of the one or more UAVs.

In any combination of the above embodiments of the drone delivery system hub, it further comprises battery charging stations along one or more of the plurality of structural arms, wherein the battery charging stations are operable for storing and charging one or more UAV batteries from the one or more UAVs.

In any combination of the above embodiments of the drone delivery system hub, the plurality of structural arms extend upward and radially outward from the center support frame.

In any combination of the above embodiments of the drone delivery system hub, at least one of the plurality of drone-conveying systems comprise a pair of opposing rails laterally spaced apart and power rollers positioned within the opposing rails.

In any combination of the above embodiments of the drone delivery system hub, it further comprises a drone storage system rotatably attached to at least one structural arm of the plurality of structural arms and rotatable about an axis extending a length of the at least one structural arm, wherein the drone storage system comprises a plurality of rail segments spaced apart the at least one structural arm and each selectively aligned, upon rotation about the at least one structural arm, with the pair of opposing rails of at least one of the plurality of drone conveying systems.

In any combination of the above embodiments of the drone delivery system hub, wherein at least one of the plurality of drone-conveying systems are operable to catapult the one or more UAVs from the one of the plurality of structural arms upon take-off.

In any combination of the above embodiments of the drone delivery system hub, wherein the parcel-conveying system comprises a center chute and a plurality of outer chutes positioned around or proximate to the center chute, wherein the center chute and the plurality of outer chutes each extend down the center support frame.

In any combination of the above embodiments of the drone delivery system hub, it further comprises a ring of spoke rails cooperatively rotatable to locations above different ones of the plurality of outer chutes where at least one of the spoke rails extends between one of the drone-conveying systems and the linking conveyor span.

In any combination of the above embodiments of the drone delivery system hub, it further comprises at least one autonomous drone diagnosis system located along at least one of the plurality of structural arms.

In any combination of the above embodiments of the drone delivery system hub, wherein one or more of the plurality of structural arms are at least one of the following: selectively pivotable toward the center support frame, and selectively slidable down the center support frame for maintenance access or extreme wind conditions.

In any combination of the above embodiments of the drone delivery system hub, wherein the plurality of structural arms comprises a plurality of upper structural arms and a plurality of lower structural arms, wherein the upper structural arms are located higher on the center support frame than the lower structural arms.

In some embodiments, a method of sending for take-off and receiving for landing unmanned aerial vehicles (UAVs) via a drone delivery system hub comprises the following operations—receiving a first of the UAVs on a first drone-conveying system supported by a first structural arm coupled to and extending outward from a center shaft frame of the drone delivery system hub; conveying, via the first drone-conveying system, the first one of the UAVs toward the center shaft frame; receiving from the first drone-conveying system the first one of the UAVs on a linking conveyor span of the drone delivery system hub, wherein at least a portion of the linking conveyor span is located or rotatably locatable over an opening of a center chute of the center shaft frame; conveying, via the linking conveyor span, the first one of the UAVs to a location aligned with the opening of the center chute of the center shaft frame; and receiving from the first one of the UAVs, or giving to the first one of the UAVs, a parcel via a parcel-conveying system supported by the center shaft frame while the first one of the UAVs is in the location aligned with the opening of the center chute.

In any combination of the above embodiments of the method further comprises: rotating the linking conveyor span to align at least one end of the linking conveyor span with a second drone-conveying system supported by a second structural arm coupled to and extending outward from the center shaft frame; and conveying, with the linking conveyor span, the first one of the UAVs to the second drone-conveying system.

In any combination of the above embodiments of the method further comprises conveying, with the second drone-conveying system, the first one of the UAVs outward and off of the second drone-conveying system during takeoff of the first one of the UAVs.

In any combination of the above embodiments of the method, the center shaft frame is mounted to an elevated surface of a building.

In any combination of the above embodiments of the method further comprises receiving a battery from the first one of the UAVs at a battery charging station on the first structural arm or the first drone-conveying system.

In any combination of the above embodiments of the method further comprises automatically conducting an autonomous diagnosis of the first one of the UAVs when the first one of the UAVs reaches, via the first drone-conveying system, an autonomous drone diagnosis system located on the first structural arm.

In any combination of the above embodiments of the method, the parcel-conveying system comprises a center chute and a plurality of outer chutes positioned around or proximate to the center chute, wherein the plurality of outer chutes comprises a first outer chute, wherein the method further comprises cooperatively rotating a plurality of spoke rails to a first rotatable position at which at least one of the plurality of spoke rails extends between the first drone-conveying system and the linking conveyor span and aligns with the first outer chute.

In some embodiments, a rooftop-mounted drone delivery system hub for facilitating parcel delivery comprises the following components—a center shaft frame; a parcel-conveying system supported by the center shaft frame, wherein the parcel-conveying system comprises one or more chutes through which one or more parcels are conveyed up and down the center shaft frame; a plurality of structural arms coupled to and extending outward from the center shaft frame, wherein the plurality of structural arms comprises at least three structural arms; a plurality of drone-conveying systems each supported by one of the structural arms and operable to receive and convey one or more unmanned aerial vehicles (UAVs) along a length of one or more of the plurality of structural arms; a plurality of battery charging stations located along the structural arms and each operable to receive at least one battery from the one or more UAVs while the UAVs are conveyed by one of the plurality of drone-conveying systems; and a linking conveyor span selectably rotatable to different orientations, at least one of the different orientations extending between at least two of the plurality of drone-conveying systems and operable to convey the one or more UAVs between the at least two of the plurality of drone-conveying systems, wherein the linking conveyor span is located above the one or more chutes such that the one or more UAVs release parcels into or receive parcels out of the one or more chutes while the one or more UAVs are located on the linking conveyor span.

What is claimed is:

1. A drone delivery system hub for facilitating parcel delivery, the drone delivery system hub comprising:
    a center support frame;
    a parcel-conveying system supported by the center support frame, wherein the parcel-conveying system comprises at least one of one or more chutes, an elevator, a spiral conveyor, an L-shaped platform, or a conveyor lift configured for moving parcels from a first elevation to a second elevation;
    a plurality of structural arms, wherein each structural arm of the plurality of structural arms is coupled to and extends upward and radially outward from the center support frame;
    a plurality of drone-conveying systems, wherein each drone-conveying system of the plurality of drone-conveying systems is supported by at least one structural arm of the plurality of structural arms, comprises one or more rails for receiving an unmanned aerial vehicle (UAV), and is operable to convey the UAV along the one or more rails and a length of the at least one structural arm of the plurality of structural arms; and
    a linking conveyor span selectably extending between at least two drone-conveying systems of the plurality of drone-conveying systems and at least partially operable to convey the UAV between the at least two drone-conveying systems of the plurality of drone-conveying systems.

2. The drone delivery system hub of claim 1, further comprising at least one controller, wherein the at least one controller is programmed to rotate the linking conveyor span based on at least one of the following: a destination of the UAV positioned on the linking conveyor span, wind conditions, or statuses of other incoming UAVs or other outgoing UAV.

3. The drone delivery system hub of claim 1, further comprising battery charging stations along one or more structural arms of the plurality of structural arms, wherein at least one battery charging station of the battery charging stations is operable for storing and charging a UAV battery for the UAV.

4. The drone delivery system hub of claim 1, wherein the one or more rails for at least one drone-conveying system of the plurality of drone-conveying systems comprise a pair of opposing rails laterally spaced apart, and power rollers positioned within the pair of opposing rails.

5. The drone delivery system hub of claim 4, further comprising a drone storage system rotatably attached to at least one structural arm of the plurality of structural arms and rotatable about an axis extending a length of the at least one structural arm, wherein the drone storage system comprises a plurality of rail segments spaced apart about the at least one structural arm and each rail segment of the plurality of rail segments is selectively aligned, upon rotation about the at least one structural arm, with the pair of opposing rails of the at least one drone conveying system of the plurality of drone-conveying systems.

6. The drone delivery system hub of claim 1, wherein at least one drone-conveying system of the plurality of drone-conveying systems is operable to catapult the UAV from the at least one structural arm of the plurality of structural arms upon take-off.

7. The drone delivery system hub of claim 1, wherein the one or more chutes comprise a center chute and a plurality of outer chutes positioned around or proximate to the center chute, and the center chute and the plurality of outer chutes each extend down the center support frame.

8. The drone delivery system hub of claim 7, further comprising a ring of spoke rails cooperatively rotatable to locations above different outer chutes of the plurality of outer chutes, wherein at least one spoke rail of the spoke rails extends between one drone-conveying system of the plurality of drone-conveying systems and the linking conveyor span.

9. The drone delivery system hub of claim 1, further comprising at least one autonomous drone diagnosis system located along at least one structural arm of the plurality of structural arms, wherein the at least one autonomous drone diagnosis system comprises at least one of a sensor, a controller, a processor, or memory configured to perform at least one of a diagnostic check or a pre-flight check of the UAV.

10. The drone delivery system hub of claim 1, wherein the plurality of structural arms comprises a plurality of upper structural arms and a plurality of lower structural arms, and the plurality of upper structural arms is located higher on the center support frame than the plurality of lower structural arms.

11. A method of sending for take-off and receiving for landing unmanned aerial vehicles (UAVs) via a drone delivery system hub, the method comprising:
    receiving a first UAV of the UAVs on a first drone-conveying system supported by a first structural arm coupled to and extending outward from a center shaft frame of the drone delivery system hub, wherein the first drone-conveying system comprises one or more rails for receiving the first UAV;
    conveying, via the first drone-conveying system, the first UAV along the one or more rails and toward the center shaft frame;
    receiving, from the first drone-conveying system, the first UAV on a linking conveyor span of the drone delivery system hub, wherein at least a portion of the linking conveyor span is located or rotatably located over an opening of a center chute of the center shaft frame;
    conveying, via the linking conveyor span, the first UAV to a location aligned with the opening of the center chute of the center shaft frame; and
    performing at least one of receiving from the first UAV or giving to the first UAV, a parcel via the center chute of the center shaft frame while the first UAV is in the location aligned with the opening of the center chute.

12. The method of claim 11, further comprising:

rotating the linking conveyor span to align at least one end of the linking conveyor span with a second drone-conveying system supported by a second structural arm coupled to and extending outward from the center shaft frame, wherein the second drone-conveying system comprises one or more second rails for receiving the first UAV; and conveying, via the linking conveyor span, the first UAV to the second drone-conveying system.

13. The method of claim 12, further comprising conveying, via the second drone-conveying system, the first UAV outward and off of the second drone-conveying system during takeoff of the first UAV.

14. The method of claim 11, wherein the center shaft frame is mounted to an elevated surface of a building.

15. The method of claim 11, further comprising receiving a battery from the first UAV at a battery charging station on the first structural arm or the first drone-conveying system.

16. The method of claim 11, further comprising automatically conducting an autonomous diagnosis of the first UAV when the first UAV reaches, via the first drone-conveying system, an autonomous drone diagnosis system located on the first structural arm, wherein the autonomous drone diagnosis system comprises at least one of a sensor, a controller, a processor, or memory configured to perform the autonomous diagnosis of the first UAV.

17. The method of claim 11, wherein the center shaft frame further comprises a plurality of outer chutes positioned around or proximate to the center chute, the plurality of outer chutes comprises a first outer chute, and the method further comprises cooperatively rotating a plurality of spoke rails to a first rotatable position at which at least one spoke rail of the plurality of spoke rails extends between the first drone-conveying system and the linking conveyor span and aligns with the first outer chute.

18. A rooftop-mounted drone delivery system hub for facilitating parcel delivery, the drone delivery system hub comprising:

a center shaft frame;

a parcel-conveying system supported by the center shaft frame, wherein the parcel-conveying system comprises at least one of one or more chutes, an elevator, a spiral conveyor, an L-shaped platform, or a conveyor lift configured for moving a parcel up and down the center shaft frame;

a plurality of structural arms coupled to and extending outward from the center shaft frame, wherein the plurality of structural arms comprises at least three structural arms;

a plurality of drone-conveying systems, wherein each drone-conveying system of the plurality of drone-conveying systems is supported by a structural arm of the plurality of structural arms and comprises one or more rails that are operable to receive and convey an unmanned aerial vehicle (UAV) along a length of the structural arm;

a plurality of battery charging stations located along the plurality of structural arms, wherein each battery charging station of the plurality of battery charging stations is operable to receive at least one battery from the UAV while the UAV is conveyed by the corresponding drone-conveying system of the plurality of drone-conveying systems; and a linking conveyor span selectably rotatable to different orientations, wherein at least one different orientation of the different orientations extends between at least two drone-conveying systems of the plurality of drone-conveying systems, the linking conveyor span is operable to convey the UAV between the at least two drone-conveying systems of the plurality of drone-conveying systems, and the linking conveyor span is located above the parcel-conveying system such that the UAV releases the parcel into or receives the parcel out of the parcel-conveying system while the UAV is located on the linking conveyor span.

* * * * *